Figures 7, 8:
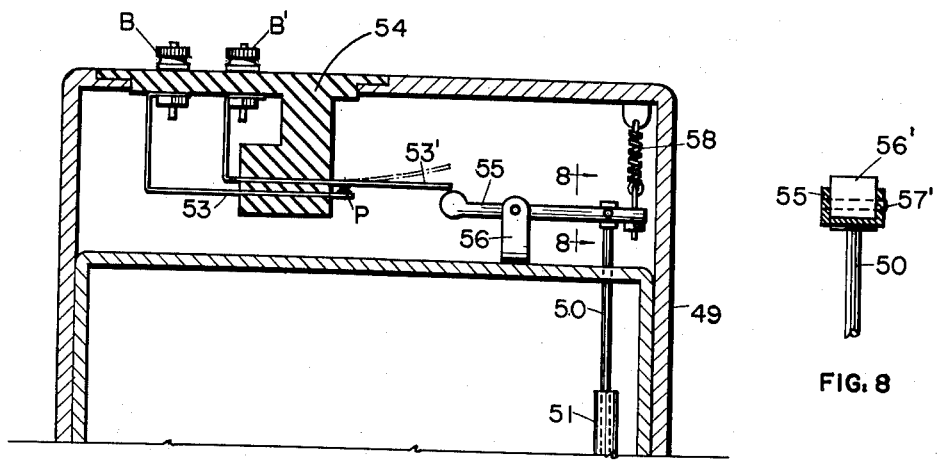

Jan. 3, 1956  A. G. ALFERMAN  2,729,337
FISH AQUARIUM AND FILTER APPARATUS THEREFOR
Filed June 8, 1953  3 Sheets-Sheet 1
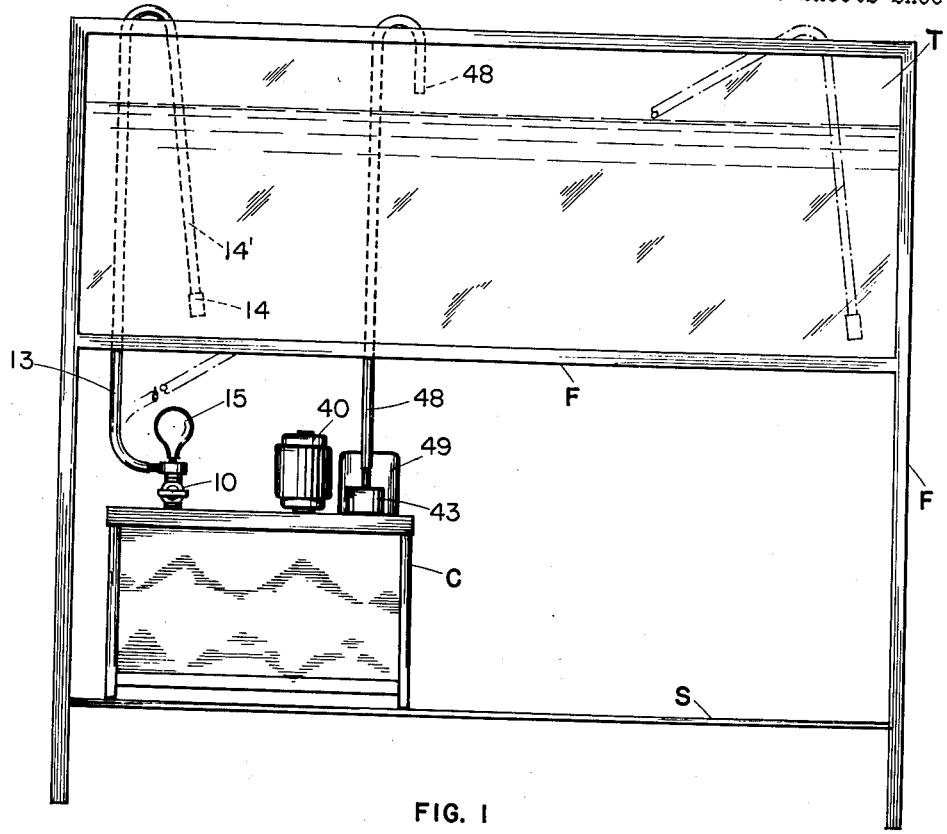
FIG. 1
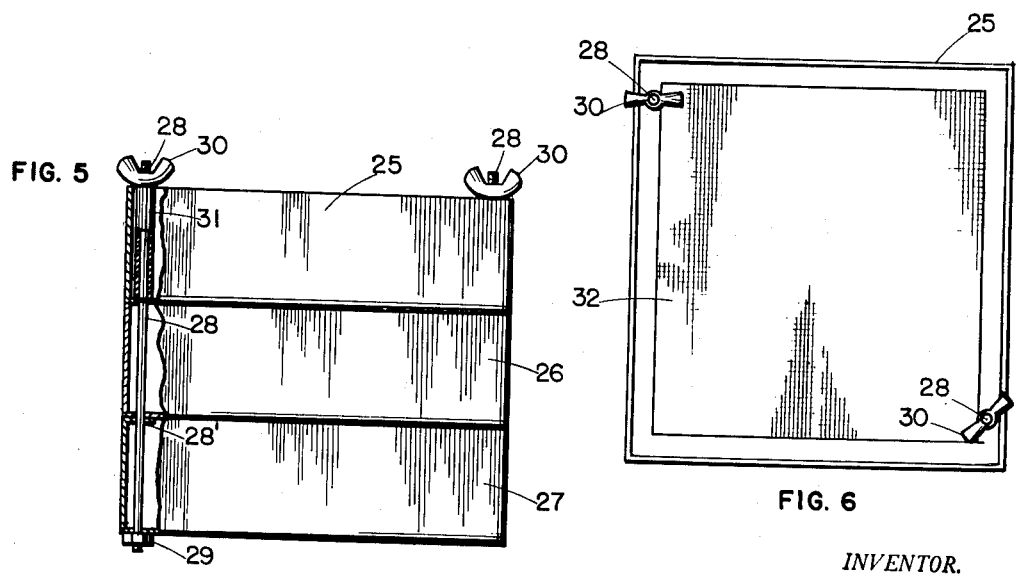
FIG. 5
FIG. 6
INVENTOR.
ALBERT G. ALFERMAN
BY Stewart Blackman
HIS ATTORNEY Jan. 3, 1956   A. G. ALFERMAN   2,729,337
FISH AQUARIUM AND FILTER APPARATUS THEREFOR
Filed June 8, 1953   3 Sheets-Sheet 2
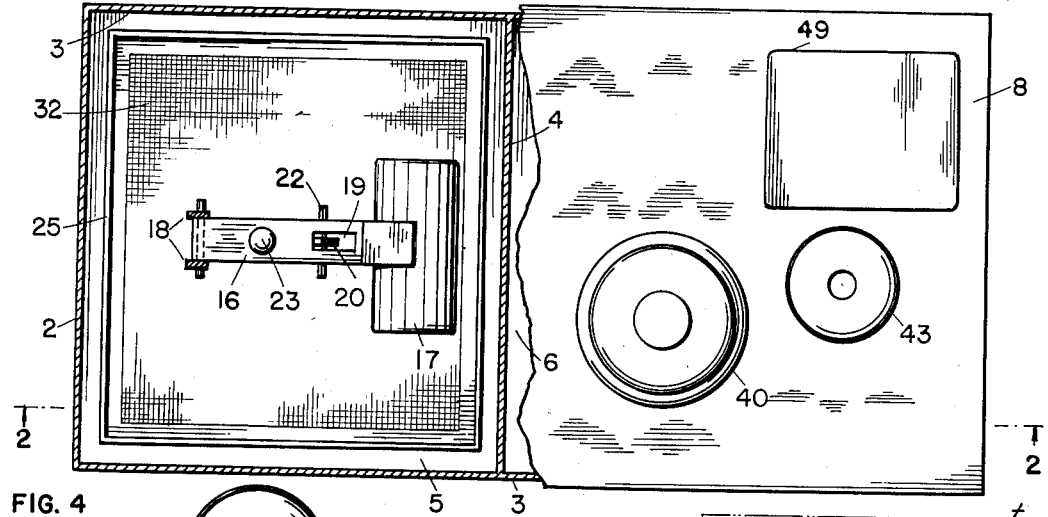
FIG. 4
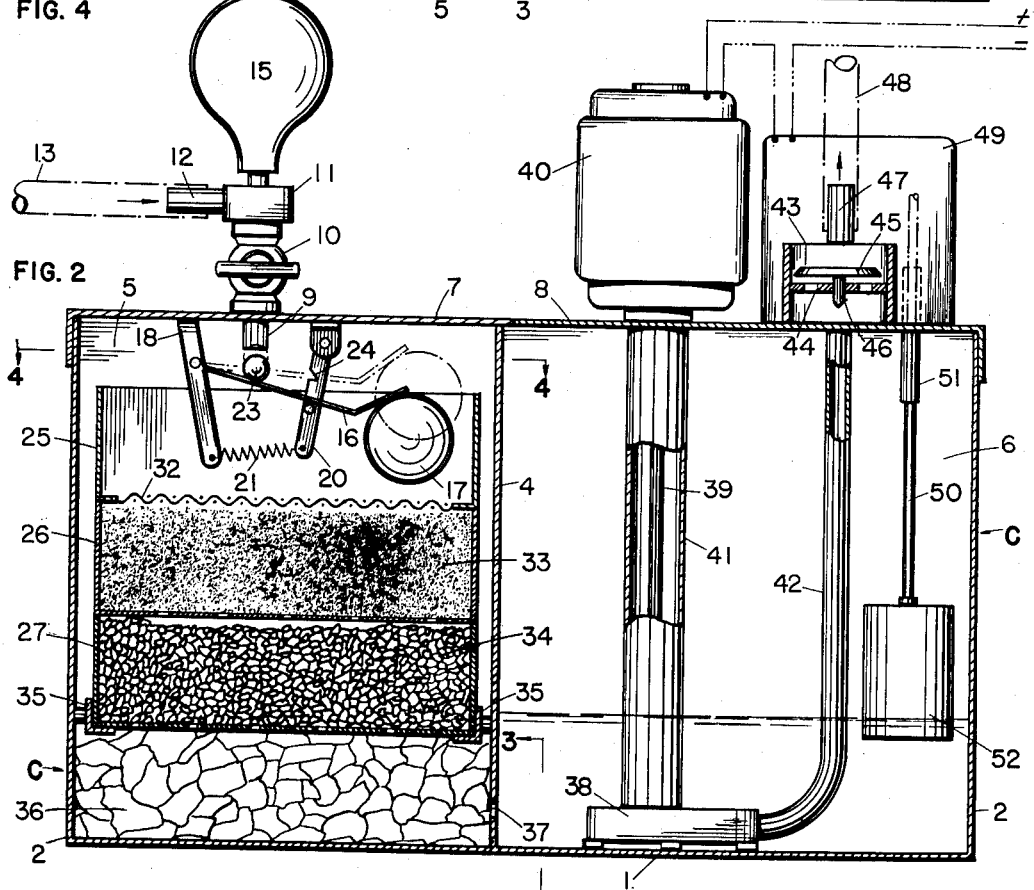
FIG. 2
FIG. 3
INVENTOR.
ALBERT G. ALFERMAN
HIS ATTORNEY Jan. 3, 1956 A. G. ALFERMAN 2,729,337
FISH AQUARIUM AND FILTER APPARATUS THEREFOR
Filed June 8, 1953 3 Sheets-Sheet 3

INVENTOR
ALBERT G. ALFERMAN
BY
ATTORNEY 2,729,337

FISH AQUARIUM AND FILTER APPARATUS THEREFOR

Albert G. Alferman, Miami, Fla.

Application June 8, 1953, Serial No. 360,022

5 Claims. (Cl. 210—150)

This invention relates to water purification systems for fish aquariums and, more especially, to an improvement in portable filter apparatus which may be removably associated with conventional household aquariums.

An object of the invention is to provide a portable filter unit for aquariums which will automatically become inactivated upon a clogging of the filter structure or water passages, or upon disturbance to the circulating system, to prevent flooding the equipment or the floor therearound.

Another object is to provide a filter unit capable of ready and convenient assembly and disassembly.

A further object is to provide equipment of the character described which is simple in construction and of compact assembly.

Yet another object is to provide in a filter circulating system for aquariums, a pick-up dip tube operable to clean the bottoms thereof while the system is in normal operation.

Another object is to provide filter apparatus for the purposes herein described, which may be readily and economically fabricated.

These and other advantages of the invention will become apparent as the detailed description thereof proceeds.

According to the invention, the aquarium is provided with a portable filter unit housed in a casing having a filter chamber and a pump chamber in lateral communication therewith, a cover for the casing, and the usual filter structure in the filter chamber; the cover carries an intake assembly communicating with the aquarium for the delivery of an unfiltered water stream therefrom and the direction of this stream in gravity flow through the filter structure; the intake assembly includes a float-operated valve associated therewith to interrupt the admission of the unfiltered water stream upon clogging of the filter structure or water passages and the consequent elevation of the water level in the filter structure or surrounding area in the filter chamber; the cover structure likewise carries a filtered water discharge assembly consisting of a pump in the pump chamber to return a filtered water stream to the aquarium, a motor for the pump and an electrical circuit for the motor, float-operated switch means interposed in the circuit operable to disable the motor and inactivate the pump upon a lowering of a pre-determined water level in the pump chamber, and a check valve in the filtered water discharge stream to prevent a reversal in the flow thereof, these valve and control devices being structurally attached to the cover to permit the separation thereof from the casing, intact with the cover, thus facilitating convenient servicing and inspection of the filter unit.

The invention is embodied in a filter unit exemplified in the accompanying drawings in which the views are as follows, like reference numerals designating identical parts throughout the several views:

Fig. 1, an elevation of an aquarium with a filter unit connected thereto;

Fig. 2, a section on line 2—2, of Fig. 4, filter structure assembly clamps omitted for clarity;

Fig. 3, a section on line 3—3, of Fig. 2;

Fig. 4, a plan of the unit with the cover broken away to show a section on line 4—4, of Fig. 2;

Fig. 5, a fractional elevation of the filter structure tray assembly and

Fig. 6, a plan thereof;

Fig. 7, a sectional elevation of conventional float-motivated switch means; and

Fig. 8, an enlarged section on line 8—8, Fig. 7.

The filter unit (Fig. 1) includes a rectangular casing C removably connected to an aquarium of conventional household type occupying a frame F supporting the tank T and including a shelf S, on which the unit is detachably positioned.

The casing (Figs. 2 and 4) has a bottom 1, a pair of end walls 2, and a pair of side walls 3 connected by a partition 4 which divides the casing into laterally related compartments defining a filter chamber 5 and a pump chamber 6. A flanged lid or cover surmounts the casing and, if desired, may be separated into individual chamber covers 7 and 8.

Mounted on the cover 7, is an intake assembly comprising an intake nipple 9 projecting downwardly through the cover from a pet-cock 10 thereabove connected to a T-fitting 11. This fitting has a lateral nipple 12 adapted to receive one end of a suction hose 13, of which the opposite end (Fig. 1) terminates in a dip-tube nozzle 14 submerged in the tank T at the end of a dip-tube 14', movable over the bottom of the tank. Connected with the T-fitting is a hand-operated air bulb 15 for a purpose to be presently set forth.

The intake assembly includes a float-operated valve (Fig. 2) consisting of an arm 16 of which one end carries a cylindrical float 17 and the opposite end has a pivotable connection with a bifurcated hanger bracket 18 suspended from the under side of the cover 7. The arm 16 has a longitudinal slot 19 cut therein through which is passed a downwardly inclined latch member 20 pivotably swung from the cover and urged toward the bracket 18 to which it is connected by a helical spring 21. A transverse pin 22 is passed through the latch member to support the arm 16 in its retracted or full line position. A ball 23, carried by the arm, is engageable with the mouth of the nipple 9 against the admission of the water stream from the aquarium upon a rise in a pre-determined water level in the filter structure, hereinafter described, and the consequent elevation of the float 17. The ball is held in positive sealing relation with the nipple 9 by engagement of the arm 16 with a notch 24 formed in the latch member, maintaining the arm and the float carried thereby in the operative positions shown in Fig. 2.

Arranged in the filter chamber is a superposed tray assembly comprising receptacles or trays 25, 26, and 27, which are clamped in place by a diagonally-opposed pair of screw-clamps (Figs. 5 and 6), each consisting of a vertical rod 28 passing through the trays and secured, as by soldering, to an adjacent element of the bottom tray shown, for example, at 28'. The rod is threaded at the bottom thereof to receive a nut 29 bearing against the bottom of the tray assembly. At the top thereof, the rod has a wing nut 30 threaded thereon to bear against the top of the tray assembly, there being a sleeve 31 passed about the rod and interposed between the wing nut 30 and the bottom of the top tray whereby to grip the tray assembly between the wing nut and the bottom nut 29. Thus, the trays may be conveniently taken apart or reassembled by unfastening the wing nut which serves, also, as a handle member for manipulating the tray assembly.

The topmost tray 25 will be seen to function as the inlet of a filter structure comprising a screen 32 of fine mesh framed in the bottom of tray 25, the next lower tray 26 carries a quantity of sand 33 and the bottom tray 27, a quantity of charcoal 34, the two lower trays having perforated bottoms, as will be understood. This assembly is supported on brackets 35 secured in any suitable manner to adjacent casing wall structure and is preferably spaced from the bottom of the filter chamber to provide a bed of loose broken stone 36 thereunder. Along this broken stone stratum and adjacent the bottom of the casing, the partition 4 is orificed as at 37 for the passage of water between the chambers 5 and 6.

Water passing through the filter structure is collected in the bottom of the pump chamber from which it is returned to the aquarium by a filtered water discharge assembly carried by the cover 8 and comprising a pump casing shown generally at 38, in which is housed the conventional impeller (not shown), driven by a vertical shaft 39 from a motor 40 on the cover. The shaft is shielded by a tube 41 secured at each end to the cover or motor structure and the pump casing from which an outlet tube 42 directs the filtered water stream through a check valve casing 43 mounted on the cover. This casing surrounds a check valve consisting of a perforated disc 44 fixed therein, over which is spaced a solid disc 45 carried on an axial pin 46 which has slideable movement in the center of the perforated disc 44. Under the influence of an upwardly moving stream therethrough, the valve will pass the returning water through the perforated disc but upon any failure in the circulation thus far described the solid disc will drop upon disc 44 sealing the perforations therein against a reverse flow of the filtered water stream back into the pump chamber.

The valve casing has an outlet nipple 47 to which is fitted a flexible delivery hose 48 terminating in the aquarium tank T for the return thereto of the filtered water stream (Fig. 1).

The motor is energized from a pair of feeders designated + and — (Fig. 2), in circuit with a quick make-and-break type of electric switch, of conventional type and well known in the art. This switch, enclosed in a switch housing 49 on the cover 8, is normally closed in the motor circuit but openable by the downward movement of a vertical stem 50 passing through the cover in a sleeve 51. This stem carries a float 52 which upon a lowering of the water in the pump chamber from a predetermined level will drop therewith to correspondingly lower the stem and interrupt the circuit to disable the motor and inactivate the pump means. A common switch assembly may have a pair of spring leaf type conductors 53 and 53', superposed in the usual insulator block 54 arranged within the housing 49. These conductors are normally in electrical contact through opposed contact points symbolized at P which are formed on the opposed faces of the conductors (Fig. 7). At their opposite ends, the conductors terminate in a pair of binding posts B and B', interposed in the negative lead, for example, shown in Fig. 2. The upper conductor 53' may be flexed toward its broken line position by engagement therewith of an oscillatory beam 55, pivoted by the downward pull of the float 52 (Fig. 2), suspended therefrom, to open the electrical contact at P and thereby interrupt the motor-energizing circuit therethrough. The stem 50 may be threadably secured in a swivel block 56' trunnioned by a pivot pin 57' on the beam 55 which is fulcrumed, in turn, in a trunnion member 56 suitably supported in the housing 49. The beam, as will be understood, is slotted for the accommodation of the swivel block 56' and the stem 50 suspended therefrom. The beam may be biased to balance against the weight of the float by a suitable spring in adjustable mechanical association with the beam, as indicated at 58. By this construction, idling of the motor and pump when insufficient water remains in the pump chamber is eliminated.

In practice, the water circulating system is initiated by plugging in the motor with the usual electrical connection (not shown) and opening the pet cock 10, at the same time squeezing the air bulb 15 to induce suction on the nozzle 14 until water begins to siphon from the tank T, to complete the water return from the pump chamber to the tank. To shut down the unit, the cock 10 is closed and operation of the electrical elements will cease as hereinabove explained upon lowering of pump chamber water level. A feature of the invention resides in the dip tube 14' (Fig. 1), which may be manipulated over the bottom of the tank with the system in service to pick up undesirable matter.

The invention is thus seen to provide a filter unit for an aquarium capable of automatic shut-down upon disturbance of the water circulating system, through inactivation of the pump means and the float-operated valve associated with the intake assembly. By virtue of the structural attachment of the intake and discharge assemblies to the cover structure, the filter unit is capable of ready and convenient disassembly for inspection and adjustments, the valve and control mechanisms being separable with the cover structure from the filter unit casing.

The invention will thus be seen to meet the objects hereinbefore set forth.

Of course, many modifications and various changes are possible in the construction of the apparatus of the invention without departing from the scope of the appended claims.

Having thus described the invention and the mode of its practice, what I claim as new and desire to secure by Letters Patent of the United States, is:

1. In a filter unit for a household aquarium, the combination of a casing defining in lateral relation a filter chamber and a pump chamber communicating therewith adjacent the bottom of said casing, individual covers for said chambers, a filter structure in the filter chamber and an intake fitting carried by the cover thereof for communication therewith and with the aquarium to direct an unfiltered water stream to the filter structure for gravity flow therethrough, float-operated valve means suspended from the filter chamber cover and operable to seal the intake fitting to interrupt the unfiltered stream upon a rise in filter structure water level, said intake fitting and valve means being structurally attached to the filter chamber cover for separation therewith from said casing, a filtered water discharge assembly carried by the pump chamber cover comprising pump means in the pump chamber and an upwardly extending outlet tube connected thereto directing a filtered water stream to the aquarium, a motor mounted on the pump chamber cover and driveably connected with said pump means, an electrical circuit for said motor, a switch housing on the pump chamber cover and switch means therein interposed in said circuit, a float in the pump chamber mechanically connected with the switch means to interrupt said circuit and inactivate the pump means upon a drop in the pump chamber water level, a check valve casing on the pump chamber cover and a check valve therein interposed in the filtered stream to check a reversal in the flow thereof, said filtered water discharge assembly being structurally attached to the pump chamber cover for separation therewith from said casing.

2. In a filter unit for a household aquarium, the combination of a casing defining in lateral relation a filter chamber and a pump chamber communicating therewith adjacent the bottom of said casing, a cover for said casing, a filter structure in the filter chamber, an unfiltered water intake assembly carried by the cover and consisting of an intake fitting communicating with the filter chamber to direct an unfiltered water stream to the filter structure for gravity flow therethrough and float-operated valve means to seal said intake fitting to interrupt the unfiltered stream upon a rise in filter structure water level, a suction hose connected to the intake fitting for the delivery thereto of unfiltered water from said aquarium, a filtered water discharge assembly carried by said cover and comprising pump means in the pump chamber and an upwardly-extending outlet tube connected thereto directing a filtered water stream to the aquarium, a motor to drive the pump means and an electrical circuit for the motor, a switch housing and switch means therein interposed in said circuit, a float in the pump chamber mechanically connected to said switch means to interrupt the circuit and inactivate said motor upon a drop in pump chamber water level, said intake and discharge assemblies being structurally attached to the cover for separation therewith from said casing.

3. The invention as defined in claim 2, and: a hand-actuated air pump connected to said intake fitting operable to induce suction in said hose for initiating the unfiltered water stream from the aquarium, a dip tube submerged in said aquarium and communicating with said hose to pick up undesirable matter from the bottom of the aquarium during normal operation of the filter unit.

4. The invention as defined in claim 2, and: said filter structure comprising a plurality of superposed trays constituting the water-filtering elements therefore, a pair of upright clamps gripping said trays in superposed assembly, each of said clamps comprising a vertical rod passed through the trays and secured at the bottom thereof to the bottom tray, threadable fastening means carried by said rod at the top thereof and engageable with the top tray to clamp the trays in superposed assembly, said top fastening means being detachable from said rod and said rod being detachable from the trays superposing the bottom tray whereby to disassemble the filter structure constituted by said trays.

5. The invention as defined in claim 2, and: a check valve casing carried by the cover and a check valve therein interposed in the filtered water stream to check a reversal of the flow of said filtered stream back into said filter chamber.

References Cited in the file of this patent
UNITED STATES PATENTS

| | | |
|---|---|---|
| 2,048,158 | Goodwin | July 21, 1936 |
| 2,293,051 | Duffy | Aug. 18, 1942 |
| 2,374,094 | Harvuot | Apr. 17, 1945 |
| 2,647,639 | Grein | Aug. 4, 1953 |